(12) United States Patent  (10) Patent No.: US 7,390,965 B2
Hartwig  (45) Date of Patent: Jun. 24, 2008

(54) TEMPORARY COVERS FOR ELECTRICAL BOXES

(76) Inventor: Daniel Hartwig, 20934 49th Ave., Denver, CO (US) 80249

( * ) Notice: Subject to any disclaimer, the term of this patent is extended or adjusted under 35 U.S.C. 154(b) by 0 days.

(21) Appl. No.: 11/561,190

(22) Filed: Nov. 17, 2006

(65) Prior Publication Data

US 2007/0107925 A1    May 17, 2007

Related U.S. Application Data

(60) Provisional application No. 60/597,228, filed on Nov. 17, 2005.

(51) Int. Cl.
*H02G 3/14* (2006.01)
(52) U.S. Cl. ............................ 174/66; 174/67; 220/241; 220/242
(58) Field of Classification Search .................. 174/66, 174/67, 58, 50, 54, 53, 57; 220/3.2, 3.3, 220/241, 242, 3.8; 439/134, 135; D13/154, D13/156, 177; 33/DIG. 10, 528; D8/353
See application file for complete search history.

(56) References Cited

U.S. PATENT DOCUMENTS 3,619,477 A * 11/1971 Rasmussen ................. 174/66
5,359,152 A * 10/1994 Hone-Lin ................... 174/53
5,526,952 A *  6/1996 Green ........................ 220/241
5,562,222 A * 10/1996 Jordan et al. ................ 220/3.8
5,710,392 A *  1/1998 Bordwell et al. ............. 174/50
6,538,202 B1   3/2003 Shaffer et al.
6,653,566 B2  11/2003 Petak et al.
6,664,471 B1 * 12/2003 Howe, Jr. .................... 174/66
6,686,540 B2   2/2004 Compagnone, Jr.
6,867,369 B2   3/2005 Wiggins
6,906,260 B2 *  6/2005 Grendahl .................... 174/66
7,075,008 B2 *  7/2006 Smith ......................... 174/66

* cited by examiner

*Primary Examiner*—Angel R Estrada
(74) *Attorney, Agent, or Firm*—Holland & Hart LLP (57) ABSTRACT

A box cover for an electrical box comprises a faceplate having a height and width that corresponds to a height and width of the electrical box, a sidewall extending from a rear surface of the faceplate, and a securement assembly that is adapted to interconnect with the electrical box and secure the cover thereto. When the cover is secured to the electrical box, the sidewall contacts the box wall along substantially the entire length of the box wall thereby creating an interior cavity. An electrical fixture may be electrically connected to one or more electrical conductors within the electrical box, and placed in the electrical box. The cover may then be secured to the electrical box, thereby providing a protective cover for the electrical fixture.

19 Claims, 11 Drawing Sheets

TEMPORARY COVERS FOR ELECTRICAL BOXES

CROSS-REFERENCE TO RELATED APPLICATIONS

The present application claims the benefit of Provisional Patent Application No. 60/597,228, filed on Nov. 17, 2005 and entitled "Temporary Construction Covers for Electrical Fixtures," the entire disclosure of which is incorporated herein by reference.

FIELD OF THE INVENTION

The present invention relates generally covers for electrical boxes, and, more particularly, to temporary covers for electrical boxes to temporarily cover such boxes during installation and construction.

BACKGROUND OF THE INVENTION

In commercial and residential construction applications, there is a continuing need to enhance efficiency of trades workers performing the construction. Such enhanced efficiency results in faster construction, along with reduced costs for performing the construction, as well as increased productivity. Such enhanced efficiency is desirable across all different trades including, for example, framers, masons, plumbers, electricians, drywallers, painters, and finish and trim carpenters, to name but a few.

With respect to electricians and electrical wiring, in particular, it is commonly required for the trades person or persons to install circuits, associated wiring, and gang boxes to receive electrical fixtures such as electrical outlets or light switches, for example. Drywallers and painters typically perform their associated task, and the electrical trades person is then required to come back and complete the installation of various electrical fixtures, such as switches and outlets, at a later time. More specifically, an electrical trades worker will typically be present at a construction site following, or concurrently with, the framing of the various walls and other structural elements of the building. The electrician will install appropriate electrical conductors between a circuit box or other circuit origination, and various electrical boxes such as boxes that will accommodate lights, electrical outlets, switches, and communications and video cables, to name but a few. Commonly, the electrician will install such conductors and terminate them at an electrical box that is adapted to receive the appropriate electrical component, such as the switch, outlet, or lighting fixture. Following the installation of the various electrical boxes and electrical conductors or cables, testing may be performed to verify appropriate electrical continuity to the different circuits.

At this point, finishing work is typically performed on interiors of buildings including, for example, drywalling, painting, installation of cabinetry, counters, and flooring, and various other finishing type work. The trades persons performing the finishing work typically cut and measure various pieces to be installed over the electrical boxes, and then cut the appropriate holes, as necessary, in the pieces to expose the previously installed electrical boxes. Such materials may include, for example, drywall, fiber board, masonry board, composite sheet material, and the like. In the application of such material, installers frequently use a router with a small cutting tip to expose the openings for the boxes by securing the sheet material in place with a minimal number of securement implements, such as screws, punching the router through the sheeting material in the general vicinity of the box, and then routing around the outer perimeter of the box to define an opening in the sheeting material. Thereafter, the sheet material is completely mounted with additional securement, such as additional screws into studs, and other finishing work is performed.

Following the finishing work, an electrician typically returns to the construction site to install the different fixtures as required for each of the electrical boxes. Following the installation, the different circuits are tested to verify the circuits are operating properly. In the event that such a circuit is not operating properly, the circuit must be repaired which often results in sheet material having to be removed from the walls and the electrical conductors repaired or replaced, with the finishing material then reattached.

As can be seen, such construction involves various steps of different trades workers, often including trades workers returning to a site on multiple different occasions. Such construction methods as a result are often inefficient due to the scheduling and performance of such different tasks by different trades workers. Requiring certain trades workers to return to a construction site on multiple occasions may require significant additional logistical planning. Furthermore, the electrical contractor that is only able to complete a certain percentage of the electrical work in the earlier stages of a project is only able to bill for, and collect payment for, that completed percentage. Accordingly, it would be advantageous to have additional electrical work completed at earlier stages of construction projects.

SUMMARY OF THE INVENTION

Embodiments disclosed herein address the above stated needs by providing electrical covers that may be placed on electrical boxes that have electrical fixtures installed therein. In one embodiment, a cover for an electrical box is provided, the electrical box having a box cavity formed from a box wall connected to a rear plate. The cover, of this embodiment, comprises (a) a faceplate having a height and width that corresponds to a height and width of the electrical box, (b) a sidewall extending from a rear surface of the faceplate, the sidewall and rear surface forming a cover cavity; and (c) a securement assembly that is adapted to interconnect with the electrical box and secure the cover thereto. When the cover is secured to the electrical box, the sidewall contacts the box wall along substantially the entire length of the box wall thereby creating an interior cavity formed from the cover cavity and the box cavity. An electrical fixture may be electrically connected to one or more electrical conductors within the electrical box, and placed in the electrical box. The cover may then be secured to the electrical box, thereby providing a protective cover for the electrical fixture.

In one embodiment, a front surface of the faceplate has a beveled or radiused edge along each of a top edge, bottom edge, right side edge, and left side edge. In another embodiment, the securement assembly comprises at least one faceplate hole that is substantially aligned with one or more corresponding securement holes in the electrical box, and a screw adapted to be inserted through the faceplate hole and into a corresponding securement hole. The securement assembly may also, in another embodiment, comprise a channel extending from the rear surface that is adapted to receive a projection from the electrical box. The projection may include a screw that projects from a securement hole of the electrical box and that frictionally engages with the channel. The securement assembly may further comprise one or more projecting members that extend into the box cavity when the channel is interconnected with the projection. The projecting member, is this embodiment, is sized, shaped, and located on the cover so as to limit displacement of the cover about the projection when the cover is secured to the electrical box.

Using covers as described in various embodiments herein, an electrician may install an electrical box and electrical wiring, install an electrical fixture in the electrical box, including making appropriate connections between the electrical fixture and wiring, and affix the cover to the electrical box to substantially cover all of the area of the electrical box and fixture. Finishing construction work may then be performed, including installation and finishing of sheet material over the electrical box and associated cover. The cover may then be removed, electrical fixture exposed, and appropriate cover plate installed over the fixture. Thus, the amount of work required after finishing construction to complete the installation of electrical fixtures is reduced.

DETAILED DESCRIPTION

For a more complete understanding of this invention, reference is now made to the following detailed description of several embodiments as illustrated in the drawing figures, in which like numbers represent the same or similar elements.

Various aspects of the present invention recognize the need for enhancing the efficiency of electricians when performing construction tasks. In particular, the requirement for electricians to return to a construction site and install electrical fixtures within the pre-wired electrical boxes is a significant source of inefficiency. Furthermore, it is often requested that such electricians perform the installation within the electrical boxes in a relatively short time period during the construction schedule that often cannot be accommodated. Additionally, in many cases construction experiences one or more delays in the construction schedule, and final finishing work is desired to be completed in as short a time period as possible in order to complete construction on time or with minimal delay. In any event, it is often desirable for the final installation and testing of electrical fixtures performed in as short a time period as possible. The present invention, in various embodiments, provides a cover for electrical boxes that allows electrical fixtures to be installed in the boxes prior to finishing the carpentry work. In this manner, an electrical fixture may be installed in an electrical box and completely wired, with the cover then placed over the electrical fixture and the electrical box in order to accommodate for the finishing work. Following the completion of the finishing work, including the installation of sheet material and any required finishing and/or painting of the sheet material, the cover may be removed to expose the already installed electrical fixture within the electrical box. Any required final installation and testing of the electrical fixture may be performed, and any appropriate face plate may then be secured to the electrical fixture and outlet box to finish installation. Thus, the time required for completing electrical fixture installations following interior finishing/painting is reduced.

Figure 1:
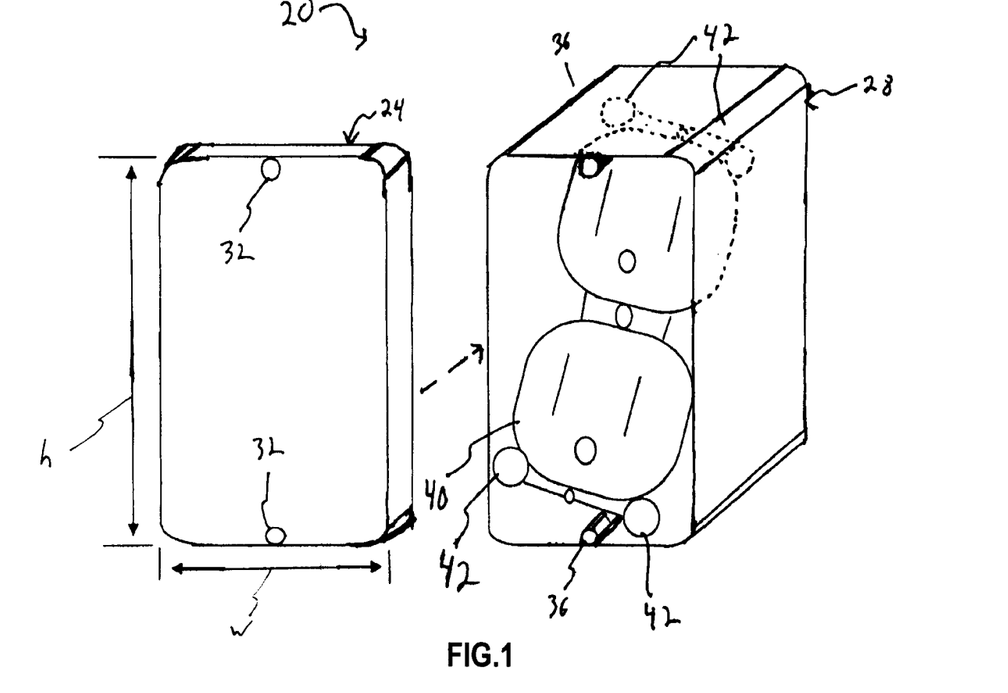
FIG. 1 is a perspective view of an electrical box with an electrical fixture and a cover for the box, for an embodiment.

With reference now to FIGS. 1-8, an outlet cover of an embodiment of the invention is described. With reference to FIG. 1, a cover and box system 20 is illustrated. A box cover 24 may be coupled to an electrical box 28 by securing the box cover 24 to the electrical box 28. The box cover 24 may be secured to the electrical box 28 in any of a number of ways, so long as the box cover 24 is reasonably secure and unlikely to be inadvertently knocked loose from the electrical box 28. A securement assembly 30 is used to secure the box cover 24 to the electrical box 28. In the embodiment of FIG. 1, the securement assembly comprises faceplate holes 32 that may be aligned with corresponding securement holes 36 within the outlet box 28. The box cover 24, in this embodiment, has a height (h) of approximately 3 and 11/16 inches (93.7 mm) and a width (w) of approximately 2 and 3/16 inches (55.6 mm), corresponding to the size of a single gang electrical box. As illustrated in FIG. 1, an electrical fixture 40 may be placed within the electrical box 28 prior to the box cover 24 being secured to the electrical box 28. The electrical box 28 may include one of any number of mounting devices that secure the electrical box 28 to an associated wall stud or other framing structure as required. Such electrical box 28 mounting devices may include a top or side bracket associated with the electrical box 28, nails that are secured to the top and/or bottom of the electrical box 28, and/or any of a number of other different mounting structures. In any event, securing the electrical box 28 to the associated wall stud may be done in any appropriate fashion, as will be readily recognized by one of skill in the art. As mentioned above, the electrical box 28 is illustrated as a single gang electrical box, although it will be understood that an electrical box may include other sizes and/or types of electrical boxes, including multiple gang boxes and non-rectangular boxes. In such various embodiments, a box cover may be sized correspondingly and include securement assemblies that secure the box cover to the electrical box. The electrical box may also include other features as well, such a mud ring, for example.

In the illustration of FIG. 1, the electrical fixture 40 is an electrical duplex receptacle, although it will be understood that other types of electrical fixtures may be installed in electrical boxes. The electrical fixture 40 in this illustration includes a mounting plate with ears 42 that, when the electrical fixture 40 is secured to the electrical box 28 during final installation, extend beyond the outer periphery of the electrical box 28. Such ears 42 act to provide a surface area that contacts sheeting material in order to provide an exterior surface of the electrical fixture 40 that is substantially planar to the sheeting material in the event that the electrical box 28 is not aligned to have a front surface that is substantially planar to such sheeting material. Such a situation may occur, for example, when a wall stud that the electrical box 28 is secured to is warped, the electrical box 28 is not installed square to the wall stud, and/or the electrical box 28 is moved out of alignment during the course of other construction activities. The electrical fixture 40 is placed in the electrical box 28 at an angle, such that the mounting plate and associated ears 42 of the fixture 40 are contained within the electrical box 28 and attached box cover 24 and do not extend beyond a periphery of the electrical box 28.

Figure 2:
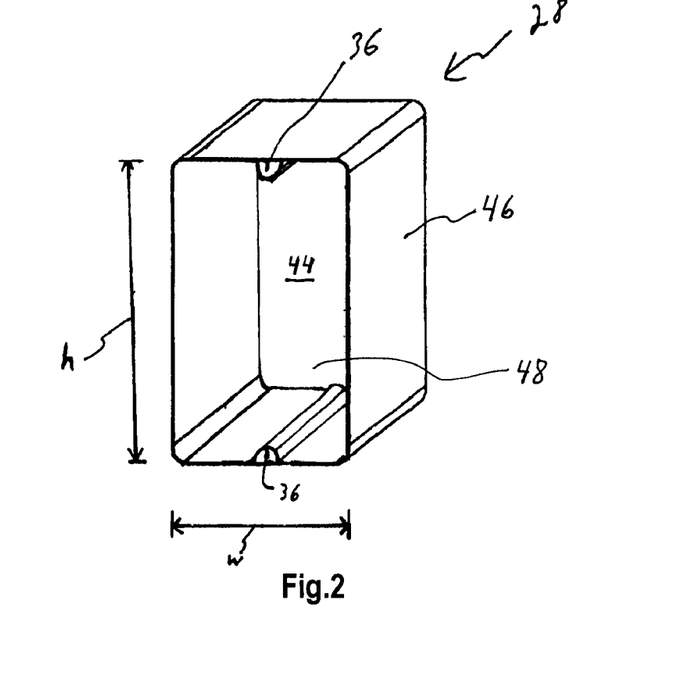
FIG. 2 is a perspective view of an electrical box.

Referring now to FIG. 2, an electrical box 28 without an electrical fixture therein is illustrated. As is typical for such electrical boxes, the electrical box 28 includes securement holes 36 that correspond with securement brackets on an electrical fixture that is designed to be installed in such an electrical box 28. Such securement brackets may include bounding plates and associated ears similarly as described with respect to FIG. 1. The electrical box has a height, indicated as h, and a width, indicated as w. In this embodiment, the height (h) of the outlet box 28 is approximately 3 and $^{11}/_{16}$ inches (93.7 mm) and the width (w) is approximately 2 and $^{3}/_{16}$ inches (55.6 mm), corresponding to the size of a single gang electrical box 28 and also corresponding to the size of box cover 24 as described above. The electrical box 28 includes a rear plate 44 and a box wall 46, that together form a box cavity 48. An electrical fixture, such as electrical fixture 40, may be placed in the box cavity 48, and secured to the electrical box 28 by securing a mounting bracket on the electrical fixture to the securement holes 36 in the electrical box 28. The electrical box 28 also includes one or more knockouts, or conduit openings, (not shown) where electrical conductors may be inserted into the electrical box 28.

Figure 3:
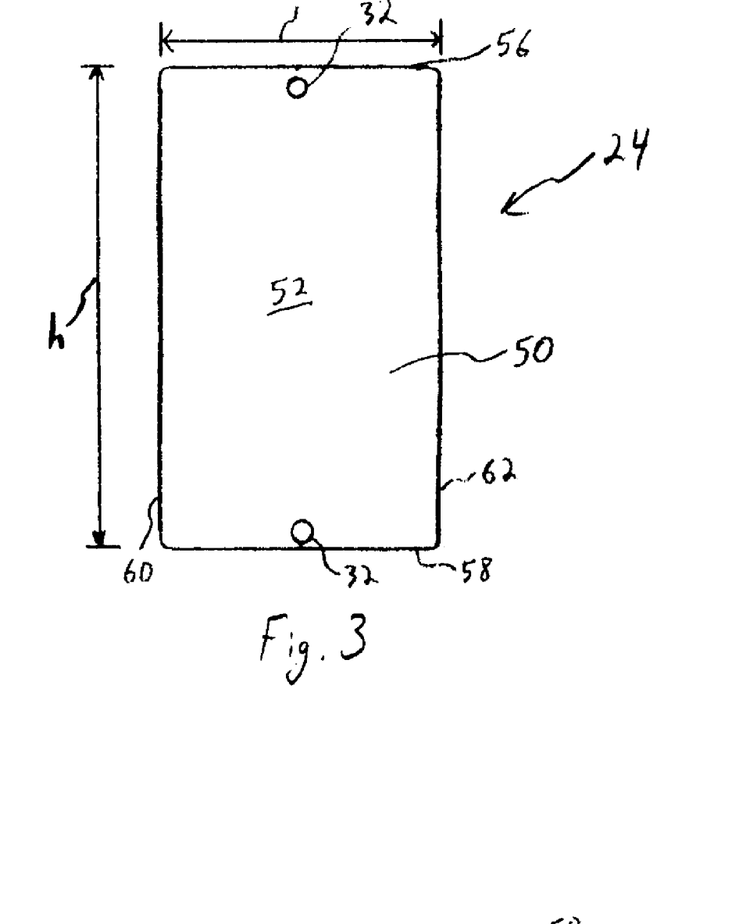
FIG. 3 is a top plan view of a cover of an embodiment.
Figure 4:
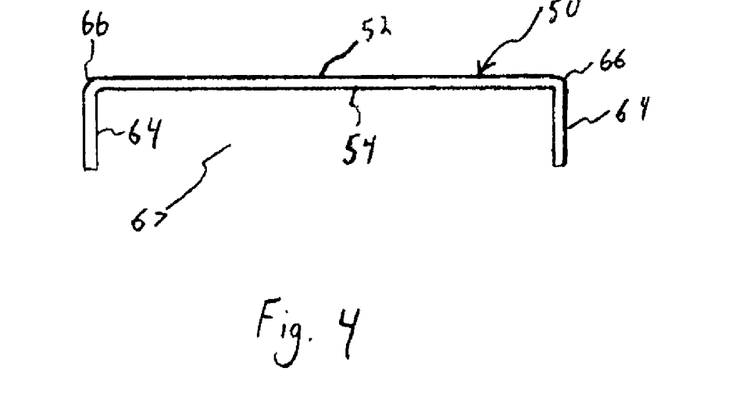
FIG. 4 is a cross-sectional view of a box cover of an embodiment.

With reference now to FIGS. 3-4, an illustration of a box cover 24 of an embodiment is illustrated. The cover 24 includes cover holes 32 that are aligned to correspond with securement holes 36 in the electrical box 28. The cover 24 has a width w and a height h as illustrated in FIG. 3. As discussed above, the width and height of the cover 24 corresponds to the width and height of the electrical box 28, thus when the cover 24 is secured to the electrical box 28, the box cover 24 substantially covers the entire opening of the box cavity 48 of electrical box 28. The box cover 24 has a faceplate 50 that has a front surface 52, a rear surface 54, a top edge 56, a bottom edge 58, a left side edge 60, and a right side edge 62. The box cover 24 also includes a sidewall 64 that extends from the rear surface 54 along each of the top, bottom, and right and left side edges 56-62 of the faceplate 50. In this embodiment, the sidewall 64 thus forms a continuous wall around the entire periphery of the box cover 24. In this embodiment, when the box cover 24 is secured to the electrical box 24, the sidewall 64 contacts the box wall 46 of the electrical box 28 around the periphery of the electrical box 28. A cross-sectional illustration of the cover 24 is illustrated in FIG. 4. The cover 24 includes a front surface 52, and the sidewall 64 attached to the rear surface 54. In one embodiment, the entire cover 24 is formed of a single piece of material, such as injected molded plastic or PVC, to form the cover 24. In other embodiments, the sidewall 64 is formed of a first piece of material and the faceplate 50 is formed of a second piece of material and secured to the sidewall 64, such as by an adhesive. The periphery of the front surface 52, in this embodiment, includes a radiused surface 66 around the periphery thereof. In other embodiments, the front surface 52 may also include a beveled surface around the periphery thereof. Providing such a beveled or radiused surface 66 reduces stress on the sheet material, such as drywall, that is installed over the cover 24. A cover cavity 67 is formed from the rear surface 54 and the sidewall 64. In one embodiment, the cover 24 is made of PVC, with the faceplate 50 and sidewall 64 having a thickness of $^{3}/_{32}$ inch (2.4 mm). In this embodiment, the sidewall 64 extends $^{5}/_{8}$ inches (15.9 mm) from the rear surface 54. However, it will be understood that these dimensions are described for the purposes of illustration only, and one of skill in the art will readily recognize that other dimensions, thicknesses, and/or materials, may be used in accordance with the present invention.

Figure 5:
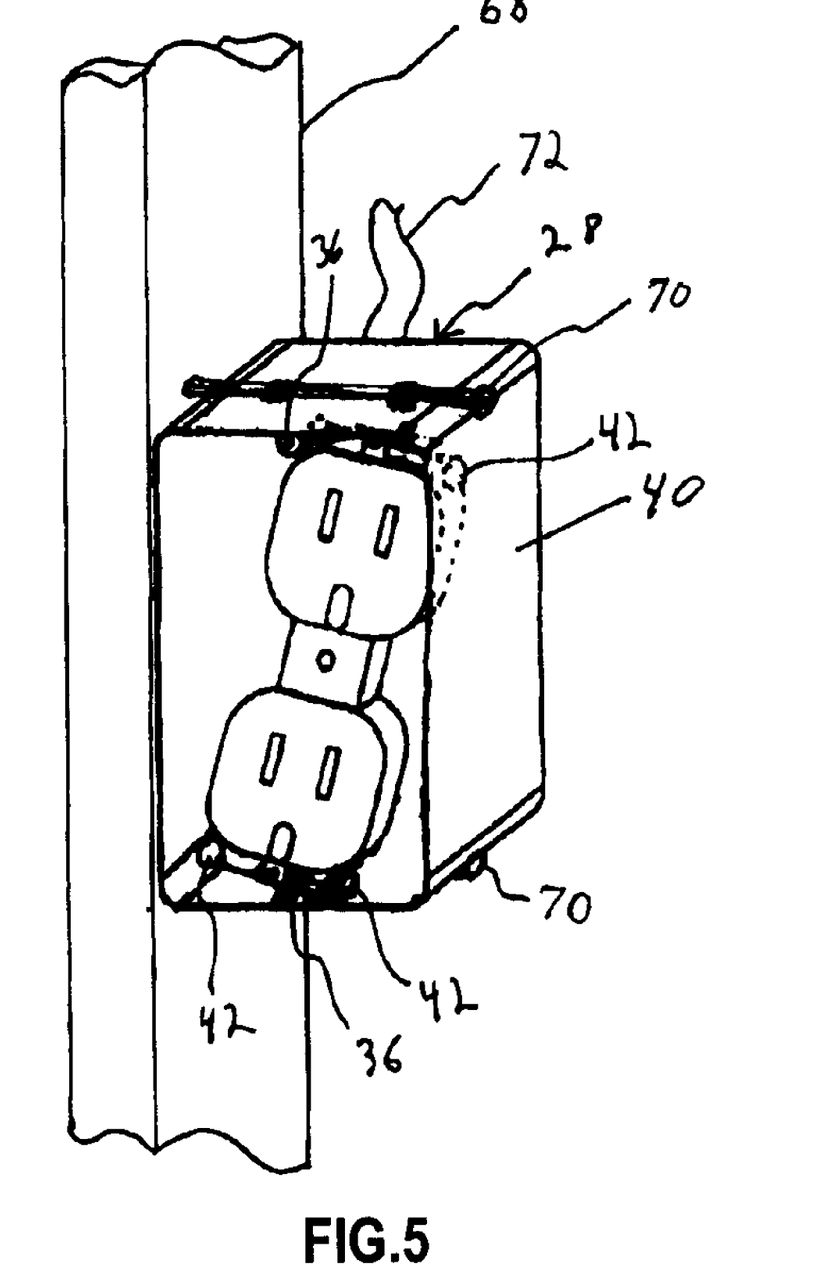
FIG. 5 is a perspective view of an electrical box with an electrical fixture mounted therein secured to a wall stud.

Referring now to FIG. 5, an electrical box 28 with an associated electrical fixture 40 placed therein is illustrated as being mounted to a wall stud 68. In this illustration, nails 70 are affixed to the top and bottom of the electrical box 28 and are driven into the wall stud 68 in order to secure the electrical box 28 to the wall stud 68. As will be understood by one of skill in the art, the electrical box 28 may be secured to any associated structural element as may be present in a particular construction project, and may be secured to such a structural element in any suitable fashion. For example, the structural element may be a metal support frame, and the electrical box secured thereto using one or more screws. An electrical conductor 72 is provided to the electrical box 28 and attaches to the electrical fixture 40. The conductor 72 is a typical electrical conductor used in such situations, such as, for example, Romex. As will also be readily understood by one of skill in the art, the electrical conductor may be one or more of any number of different electrical conductors, including high voltage electrical conductors and/or low voltage electrical conductors. The conductor 72 typically enters into the electrical box 28 through a conduit or knock-out on the top, back, or side of the electrical box. In such a manner, the electrical box 28 may be installed an the electrical fixture 40 wired and placed within the electrical box 28 prior to any sheeting material, such as drywall, being installed over the wall stud 68.

Figure 6:
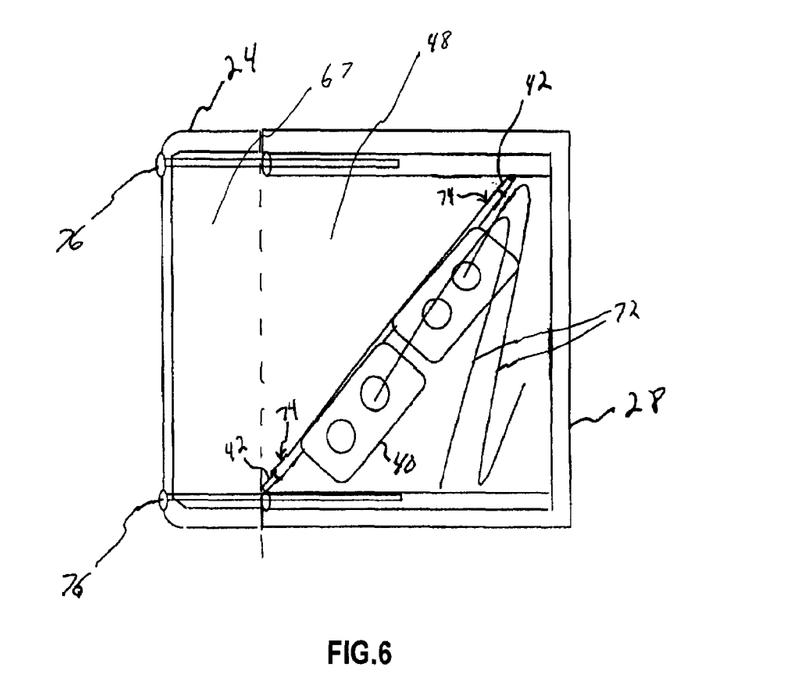
FIG. 6 is a cross-sectional illustration of an electrical box and associated electrical fixture along with a cover of an embodiment.
Figure 7:
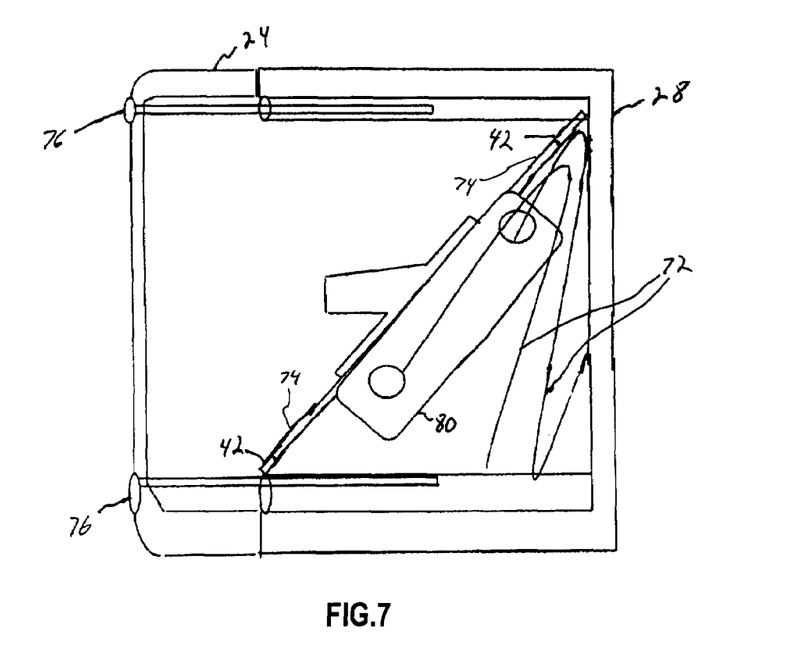
FIG. 7 is a cross-sectional illustration of an electrical switch with an electrical box and covered by a cover of an embodiment.

Referring now to FIGS. 6-9, the installation of the cover 24 over an associated electrical box 28 is now described. Initially, as illustrated in FIG. 6, an electrical box 28 and electrical fixture 40 are assembled. Such assembly may be done in a traditional manner, such as by affixing the electrical conductors 72 to the appropriate terminals of the electrical fixture 40, and placing the electrical fixture 40 into the electrical box 28. As discussed above, the electrical fixture 40 includes a mounting plate 74 that has associated ears 42. The mounting plate 72 will ultimately be secured to securement holes 36 of the electrical box 28, and a wall plate secured to the electrical fixture 40, as will be readily recognized by one of skill in the art. The mounting plate 72 is contained within the electrical box 28. The ears 42 of the mounting plate 72, when the fixture 40 is secured to the electrical box 28, typically extend beyond a periphery of the electrical box 28, thus the fixture 40 is placed at an angle with respect to the electrical box 28 in order to fit the mounting plate 72 and associated ears 42 within the electrical box 28. While the electrical fixture 40 is described as having a mounting plate 72 that may include portions that extend beyond the periphery of the electrical box 28, it will be understood that many electrical fixtures do not have portions of the mounting plate 72 that extend beyond the periphery of the electrical box 28. Furthermore, in some applications, ears 42 may be removed from a mounting plate 72. Whether an electrical fixture 40 is selected that has such features, or that has such features removed, depends upon the application and requirements of a particular project. While the electrical fixture 40 is described as having a mounting plate 72 with ears 42, other embodiments use electrical fixtures that do not have any features that extend beyond the periphery of the electrical box 28. In some embodiments such electrical fixtures may be secured to securement holes 36 of the electrical box 28 prior to the cover 24 being attached to the electrical box 28.

Figure 8:
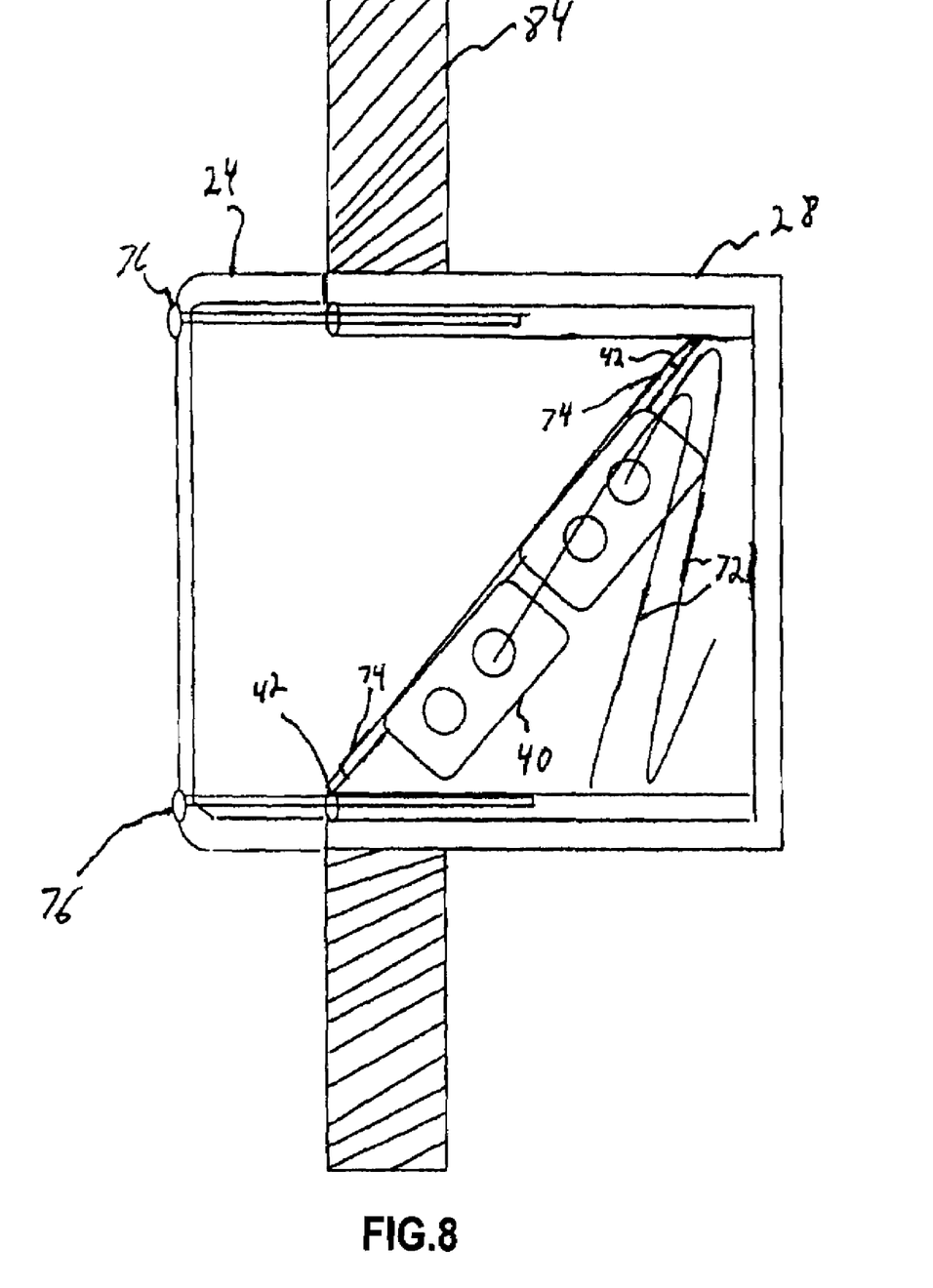
FIG. 8 is a cross-sectional illustration of an electrical fixture and an electrical box with a cover of an embodiment, illustrated with finishing sheet material.

Still referring to FIG. 6, the box cover 24 is secured to the electrical box 28 with screws 76. The screws 76 are inserted through the cover holes 32 and into the securement holes 36 of the electrical box 28. In this manner, the cover 24 is secured to the electrical box 28, with the electrical fixture 40 fully wired therein. While FIG. 6 illustrates an electrical receptacle within the electrical box 28, it will be understood that any electrical fixture 40 may be included in such an electrical box 28, a light switch 80 being illustrated within the electrical box 28 of FIG. 7. The cover 24 and cover cavity 67 allow the front surface 52 of the faceplate 50 to be offset from the electrical box 28 by a distance to accommodate the appropriate electrical fixture 40 or electrical fixture 80 as illustrated in FIG. 8, and to allow for the removal of the cover 24 at the appropriate time. In some embodiments, the electrical fixture may need to be placed at an angle within the electrical box 28 that will result in the electrical fixture extending beyond the box cavity 48, and the cover cavity 67 may be used to accommodate the electrical fixture.

Referring now to FIG. 8, an electrical box 28, associated electrical fixture 40, and secured box cover 24 are illustrated along with sheeting material 84. As is well known in the art, the installation of such sheeting material, such as drywall, is accomplished by securing the material 84 in a minimum number of places to secure it to the structure that it is being mounted to, such as wall studs. At this point, appropriate openings are cut out for various fixtures that are to be present in the surface, such as the electrical fixtures 40 illustrated in FIG. 8. When the material 84 is secured in the minimum number of positions, a router is typically used to cut the openings in the material 84. In order to reduce stresses in the material 84, and reduce the likelihood that the material 84 will be scored and/or cracked, the edge surfaces of the cover 24 are radiused or beveled, as described previously with respect to FIG. 4. The router may be inserted into the material 84 in a location that is known to be adjacent to the electrical fixture 40 and associated electrical box 28 and cover 24. The router is inserted until a change in resistance is felt by a user, indicating the router tip has contacted the surface of the cover 24 or has otherwise penetrated through the material 84. The router may then be moved through the material 84 towards one edge of the box cover 24. The user of the router, while moving the router towards the edge of the cover 24, continuously checks for resistance of the router tip against the cover 24, and the point where a change in resistance is felt indicates that the router tip has encountered the edge of the box cover 24. At this point, the user can apply pressure to the router onto the outside edge of the box cover 24 and move the router around the entire periphery of the cover 24, thereby cutting a hole in the material 84 that is approximately equal in size to the periphery of the cover 24. When holes have been cut in the material 84 for each of the appropriate electrical boxes and/or other fixtures, the material 84 may be completely secured to the wall studs and the installation of the material may be completed. At this point, other finishing work may also be completed including, for example, masking and sanding of the material 84, as well as painting of the material 84 and/or other interior surfaces in a particular room. Following the completion of the finishing work, the cover 24 may be removed from the electrical box 28 by removing screws 76 and the cover 24. This exposes the electrical fixture 40 that may then be secured to the electrical box 28 in a traditional manner, and an appropriate wall plate may then be affixed to the electrical fixture 40 to cover the areas of the fixture that are not to be exposed, and electrical box 28. As discussed above, the mounting flange 74 and associated ears 42 of the electrical fixture 40 may extend beyond the periphery of the electrical box 28, and contact the sheeting material 84 when the fixture 40 is mounted to the electrical box 28. In this manner, the face of the electrical fixture 40 is substantially planar with respect to the plane of the sheeting material 84. Thus, when a wall plate is affixed to the fixture 40, the wall plate, and the face of the fixture 40 are substantially planar with respect to each other, as well as the plane of the sheeting material 84.

Figure 9:
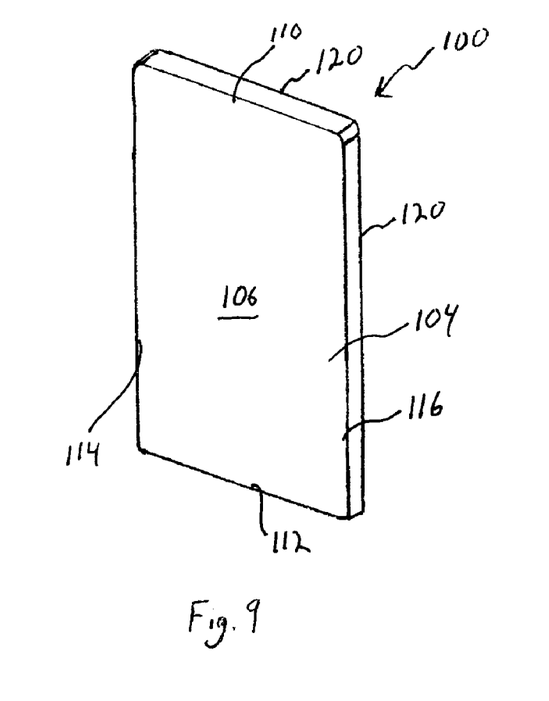
FIG. 9 is a perspective view of a box cover of another embodiment.
Figure 10:
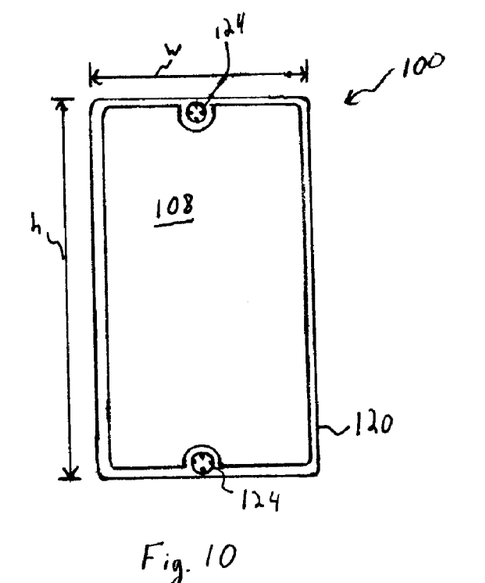
FIG. 10 is a rear plan view of a box cover of the embodiment of FIG. 9.

Referring now to FIGS. 9-10, a box cover 100 of another embodiment is illustrated. FIG. 9 illustrates a front perspective view of this box cover 100, and FIG. 10 illustrates a rear plan view of the cover 100. In this embodiment, the box cover 100, similarly as described above, has a width w and a height h as illustrated in FIG. 10. As discussed above, the width and height of the box cover 100 corresponds to the width and height of the electrical box 28, thus when the box cover 100 is secured to the electrical box 28, the box cover 100 substantially covers the entire opening of the box cavity 48 of electrical box 28. The box cover 100 has a faceplate 104 that has a front surface 106, a rear surface 108, a top edge 110, a bottom edge 112, a left side edge 114, and a right side edge 116. The box cover 100 also includes a sidewall 120 that extends from the rear surface 54 along each of the top, bottom, and right and left side edges 110-116 of the faceplate 104. In this embodiment, the sidewall 120 thus forms a continuous wall around the entire periphery of the box cover 100. In this embodiment, the box cover 100 is secured to an electrical box through a securement assembly that comprises channels 124. A projection from an electrical box extends into the channels 124 and frictionally engage the sides of the channels 124 and hold the box cover 100 to the electrical box. In some embodiments, the channels 124 have one or more ridges of deformable material along the length thereof, such that when sliding a projection of an electrical box into the channel 124, the projection contacts the ridge and forms a secure frictional fit. Similarly as described above, when the box cover 100 is attached to an electrical box, the sidewall 120 contacts the box wall of the electrical box around the periphery of the electrical box. The cover 100, similarly as described above, may be formed of a single piece of material, such as injected molded plastic or PVC, or the sidewall 120 may be formed of a first material and the faceplate 104 formed of a second material that is secured to the sidewall 104, such as by an adhesive. The periphery of the front surface 106 may include a radiused or beveled surface around the periphery thereof. A cover cavity 67 is formed from the rear surface 54 and the sidewall 64.

Figure 11:
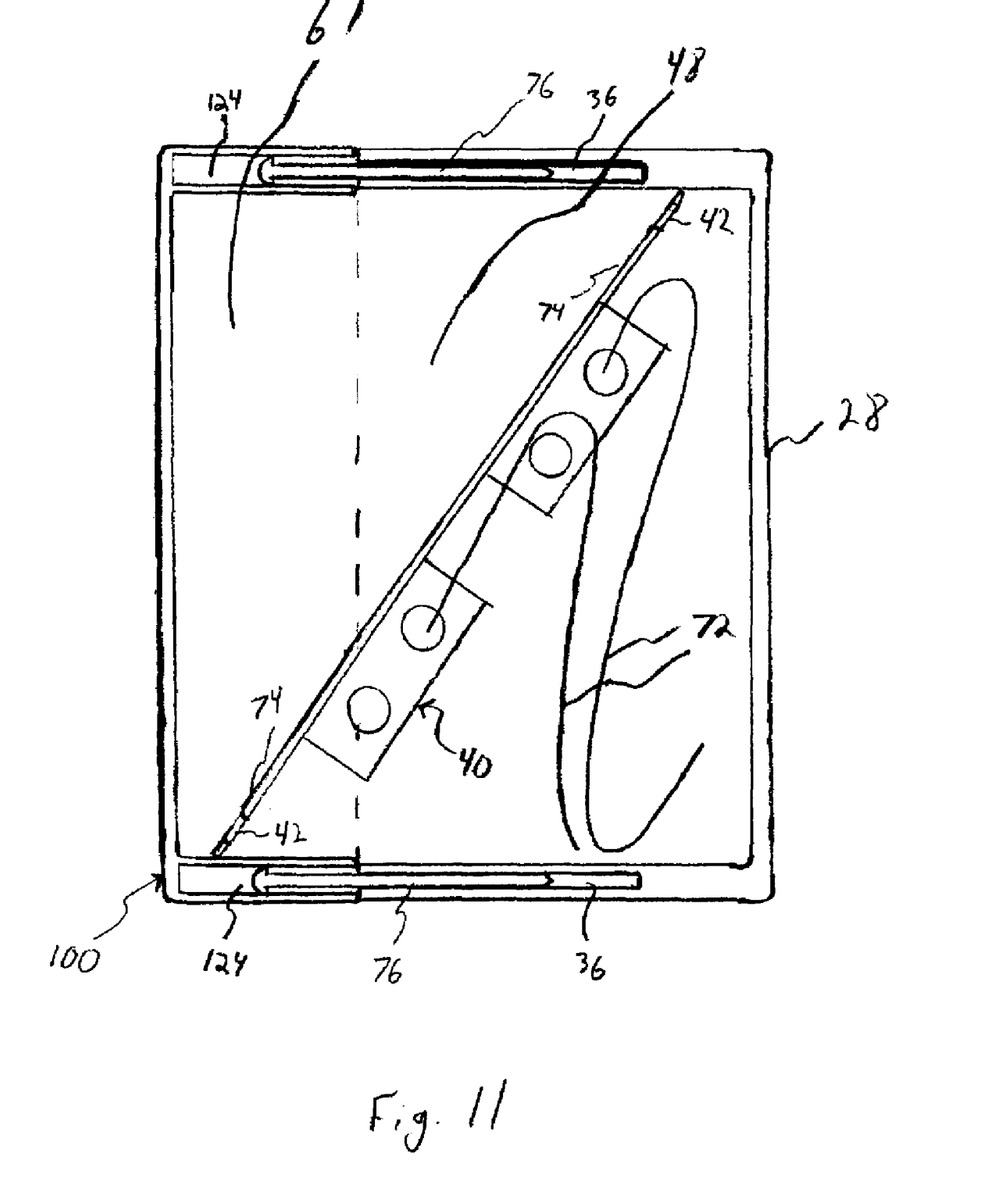
FIG. 11 is a cross-sectional illustration of an electrical box and associated electrical fixture along with a cover of the embodiment of FIG. 9.

Referring now to FIG. 11, the installation of the cover 100 over an associated electrical box 28 is now described. FIG. 11 is a cross-sectional illustration of the cover 100, electrical box 28, and associated electrical fixture 40. Assembly of the electrical fixture 40 within the electrical box 28 may be done in any traditional manner, such as by affixing the electrical conductors 72 to the appropriate terminals of the electrical fixture 40, and placing the electrical fixture 40 into the electrical box 28. As discussed above, the electrical fixture 40 includes a mounting plate 74 that may also have associated ears 42. The mounting plate 72 will ultimately be secured to securement holes 36 of the electrical box 28, and a wall plate secured to the electrical fixture 40, as will be readily recognized by one of skill in the art. The mounting plate 72 is contained within the electrical box 28. The ears 42 of the mounting plate 72, when the fixture 40 is secured to the electrical box 28, typically extend beyond a periphery of the electrical box 28, thus the fixture 40 is placed at an angle with respect to the electrical box 28 in order to fit the mounting plate 72 and associated ears 42 within the electrical box 28. While the electrical fixture 40 is described as having a mounting plate 72 that may include portions that extend beyond the periphery of the electrical box 28, it will be understood that many electrical fixtures do not have portions of the mounting plate 72 that extend beyond the periphery of the electrical box 28, and in some applications, ears 42 may be removed from a mounting plate 72. While the electrical fixture 40 is described as having a mounting plate 72 with ears 42, other embodiments use electrical fixtures that do not have any features that extend beyond the periphery of the electrical box 28. In some embodiments such electrical fixtures may be secured to securement holes 36 of the electrical box 28 prior to the cover 24 being attached to the electrical box 28.

Still referring to FIG. 11, the box cover 100, in this embodiment, is secured to the electrical box 28 by force fitting the channels 124 over screws 76 that are partially screwed into securement holes 36. The screws 76 are partially screwed into securement holes 36 such that the head of the screws is spaced from the plane of the front of the electrical box 28, such that the channels 124 of the cover 100 may be placed over the screws 76 and held in place by the frictional engagement between the head of the screws 76 and the sides of the channels 124. In this manner, the cover 100 is secured to the electrical box 28, with the electrical fixture 40 fully wired therein. While channels 124 are illustrated in FIG. 9-11 as being circular, it will be understood that any shape of channel may be used, so long as a frictional engagement between a projection from an electrical box and the channel is of sufficient strength to help prevent inadvertent removal of the box cover. Furthermore, one or more channels 124 may have an associated hole in the faceplate 104, allowing a screw to be screwed all the way through the channel and into a securement hole. In such an embodiment, the head of the screw is selected to be larger than the faceplate hole associated with the channel, and the cover secured to the electrical box in a similar manner as described with respect to FIGS. 1-8.

While FIG. 11 illustrates an electrical receptacle within the electrical box 28, it will be understood that other types of electrical fixtures may be included in such an electrical box. The cover 100 and cover cavity 67 allow the front surface 106 of the faceplate 104 to be offset from the electrical box 28 by a distance to accommodate the appropriate electrical fixture 40, and to allow for the removal of the cover 100 at the appropriate time. In some embodiments, the electrical fixture may need to be placed at an angle within the electrical box 28 that will result in the electrical fixture extending beyond the box cavity 48, and the cover cavity 67 may be used to accommodate the electrical fixture.

Figure 12:
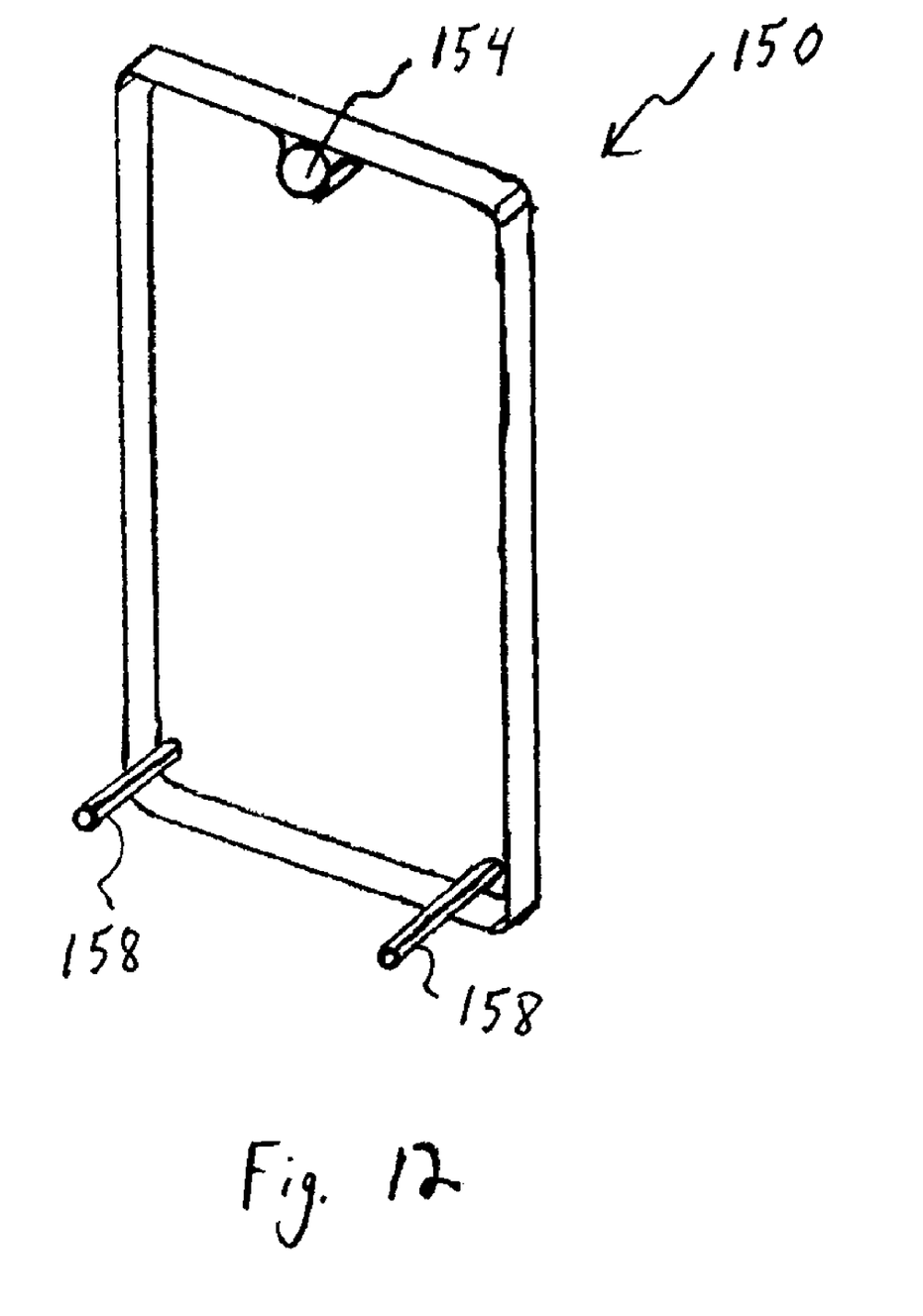
FIG. 12 is a rear perspective view of a box cover of another embodiment.
Figure 13:
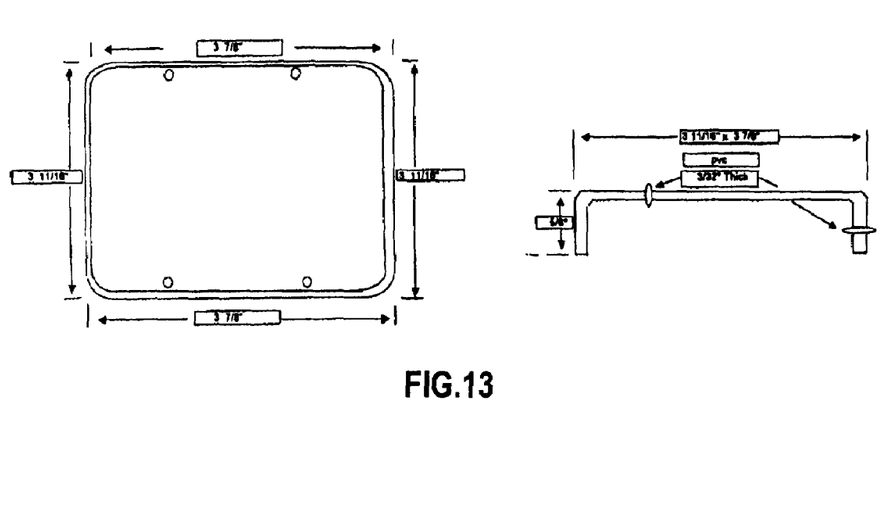
FIGS. 13-16 illustrate covers for various other sized outlet boxes of several embodiments of the invention.
Figure 14:
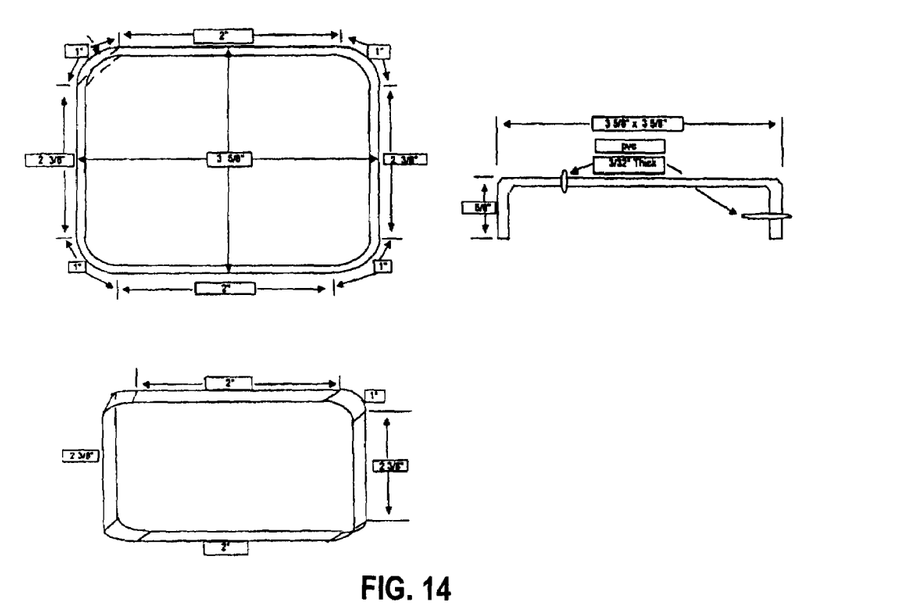
Figure 15:
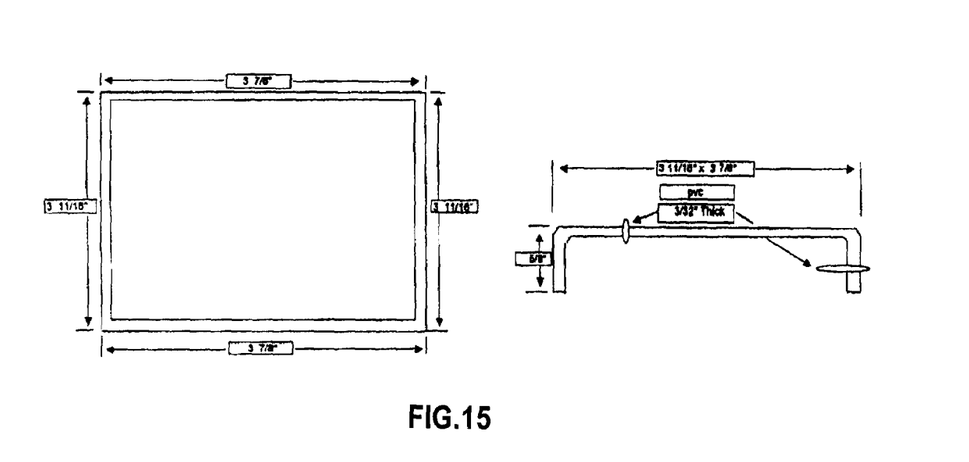
Figure 16:
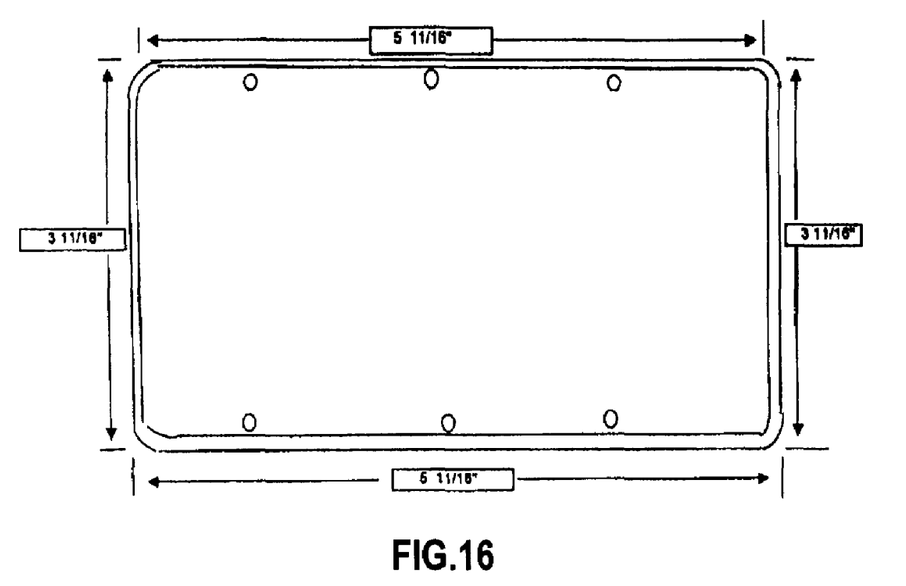

While screws 76 are illustrated in FIG. 11, it will be understood that other types of projections may be used to secure a cover to an electrical box. Furthermore, other types of securement assemblies may be used in various embodiments. For example, a box cover may include a projection that may be inserted into securement holes of an electrical box, and an electrical box may include projections other than screws that may be inserted into one or more channels in a cover. Furthermore, a box cover may include other types of projections that may engage with an electrical box to help secure the cover to the box. Such other projections may include wings that are biased outwardly such that they may be inserted into an electrical box and apply pressure to the box walls, thereby securing the cover to the box. Other projections may also include one or more posts that act to prevent displacement of a cover when secured to an electrical box. For example, FIG. 12 illustrates a box cover 150 that has a channel 154 and posts 158. In this embodiment, a projection, such as a screw partially inserted into a securement hole of an electrical box, may be inserted into channel 154, such that the cover is frictionally engaged with an electrical box. Posts 158 are aligned on the box cover 150 such that when the cover 150 is secured to an electrical box, the posts engage with the walls of the electrical box and prevent the cover 150 from being displaced about the projection. In this manner, a single screw may be used, in conjunction with posts 150 to secure the cover 150 to an electrical box and and also prevent inadvertent movement of the cover 150 relative to the electrical box. While a single channel and two posts are illustrated in FIG. 12, it will be understood that numerous different variations of securement assemblies may be used on such covers to secure the covers to electrical boxes.

While the various embodiments described above are discussed and illustrated as single gang electrical boxes, and appropriately sized single gang electrical box covers, it will be appreciated that such box covers may be sized for any electrical box size. FIGS. 13-16 illustrate various other embodiments of the present invention that are sized to be affixed to various different sized electrical boxes. In a similar manner as described above, the covers of FIGS. 13-16 may be affixed to electrical boxes that may have associated electrical fixtures therein. The covers also include holes, or other securement assemblies, that are aligned to match with securement holes in associated electrical boxes. Thus, the covers may be installed on the electrical boxes in a similar fashion as described above and finishing material, such as drywall, may be installed around the cover and box in a similar manner as described above, with finishing work and final installation also performed similarly as described above.

Furthermore, box covers may be appropriately sized and shaped to be secured to circular or other non-rectangular type electrical boxes, such as electrical boxes that are commonly used for lighting fixtures. Also, in some embodiments, two or more single gang box covers may be secured to a double (or more) gang electrical box. In some embodiments, a portion of a box cover may need to be trimmed, such as by removing a right or left side edge, to properly fit over a multi-gang electrical box. In this manner, a single size of rectangular box cover may be used in conjunction with electrical boxes of varying sizes.

While the invention has been particularly shown and described with reference to various embodiments thereof, it will be readily understood by those skilled in the art that various other changes in the form and details may be made without departing from the spirit and scope of the invention.

What is claimed is:

1. A cover for an electrical box containing an electrical fixture, the electrical box having a box cavity formed from a box wall connected to a rear plate, the cover comprising:
   a faceplate having a height and width that corresponds to a height and width of the electrical box, said faceplate comprising a front surface, a rear surface, a top edge, a bottom edge, a right side edge, and a left side edge;
   a sidewall extending from said rear surface along the length of each of said top edge, bottom edge, right side edge, and left side edge, said sidewall and said rear surface forming a cover cavity; and
   a securement assembly that interconnects with the electrical box and secures said cover thereto such that when said cover is secured to the electrical box, said sidewall contacts the box wall along substantially the entire length of the box wall thereby creating an interior cavity formed from said cover cavity and the box cavity, wherein the electrical fixture is freestanding within said interior cavity when said cover is secured to the box.

2. The cover, as claimed in claim 1, wherein said faceplate comprises a beveled or raduised edge on said front surface along each of said top edge, bottom edge, right side edge, and left side edge.

3. The cover, as claimed in claim 1, wherein said sidewall and said faceplate are formed of an integral piece.

4. The cover, as claimed in claim 1, wherein said securement assembly comprises:
   at least one faceplate hole that is substantially aligned with one or more corresponding securement holes in the electrical box; and
   a screw adapted to be inserted though said faceplate hole and into a corresponding securement hole.

5. The cover, as claimed in claim 1, wherein said securement assembly comprises:
   a channel extending from said rear surface that is adapted to receive a projection from the electrical box.

6. The cover, as claimed in claim 5, wherein the projection comprises a screw that projects from a securement hole of the electrical box, and wherein said channel is sized to frictionally engage with the screw.

7. The cover, as claimed in claim 5, wherein said channel is located proximate to one of said top edge and said bottom edge at a location that corresponds with a securement hole of the electrical box.

8. The cover, as claimed in claim 7, further comprising at least one projecting member that extends into the box cavity when said channel is interconnected with the projection, said at least one projecting member being sized, shaped, and located on said cover so as to limit displacement of said cover about the projection when said cover is secured to the electrical box.

9. The cover, as claimed in claim 1, wherein an electrical fixture may be electrically connected with one or more electrical conductors within the electrical box, the electrical fixture including mounting tabs that extend beyond the outer periphery of the electrical box when the electrical fixture is mounted to the electrical box,
   wherein the electrical fixture may be placed within the electrical box and said cover secured to the electrical box with the electrical fixture and mounting tabs contained within said interior cavity.

10. An electrical fixture system comprising:
   an electrical box comprising:
      a rear plate;
      a box wall connected to said rear plate and extending around a periphery thereof, said box wall and rear plate forming a box cavity, said box wall comprising at least one inlet though which electrical conductors may be inserted into said box cavity; and
   a cover comprising:
      a faceplate having a height and width that corresponds to a height and width of said electrical box, said faceplate comprising a front surface, a rear surface, a top edge, a bottom edge, a right side edge, and a left side edge;
      a sidewall extending from said rear surface along the length of each of said top edge, bottom edge, right side edge, and left side edge, said sidewall and said rear surface forming a cover cavity; and
      a securement assembly that is adapted to secure said cover to said electrical box such that when said cover is secured to said electrical box, said sidewall contacts said box wall along substantially the entire length of said box wall thereby creating an interior cavity formed from said cover cavity and said box cavity, said interior cavity having a larger volume than said box cavity, said securement assembly comprising a securement channel that frictionally engages with a projection from a securement hole in the electrical box.

11. The electrical fixture system, as claimed in claim 10, wherein said securement assembly further comprises:
   at least one faceplate hole that is substantially aligned with one or more corresponding securement holes in said electrical box; and
   a screw adapted to be inserted though said at least one faceplate hole and into a corresponding securement hole.

12. The electrical fixture system, as claimed in claim 10, wherein said projection comprises a screw.

13. The electrical fixture system, as claimed in claim 10, wherein said channel is located proximate to one of said top edge and said bottom edge at a location that corresponds with a securement hole of said electrical box.

14. The electrical fixture system, as claimed in claim 10, further comprising:
   an electrical fixture adapted to be interconnected with the at least one electrical conductor and placed within said electrical box and said cover secured to the electrical box with said electrical fixture contained within said interior cavity.

15. A cover for an electrical box containing an unmounted electrical fixture, the electrical box having a box cavity formed from a box wall connected to a rear plate, the electrical fixture having a mounting plate and at least one mounting ear that extends outside of the box cavity when the electrical fixture is mounted to the electrical box, the cover comprising:
   a faceplate having a height and width that corresponds to a height and width of the electrical box, said faceplate comprising a front surface, a rear surface, a top edge, a bottom edge, a right side edge, and a left side edge;
   a sidewall extending from said rear surface along the length of each of said top edge, bottom edge, right side edge, and left side edge, said sidewall and said rear surface forming a cover cavity, and
   a securement assembly that interconnects with the electrical box and secures said cover thereto such that when said cover is secured to the electrical box, an interior cavity is formed from said cover cavity and the box cavity, and the unmounted electrical fixture fits within said interior cavity when said cover is secured to the box.

16. The cover, as claimed in claim 15, wherein said securement assembly comprises:
   a securement channel that frictionally engages with a projection from a securement hole of the electrical box.

17. The cover, as claimed in claim 16, wherein said projection comprises a screw.

18. The cover, as claimed in claim 16, wherein said securement channel is located proximate to one of said top edge and said bottom edge at a location that corresponds with the securement hole of the electrical box.

19. The cover, as claimed in claim 18, further comprising at least one projecting member that extends into the box cavity when said channel is interconnected with the projection, said at least one projecting member being sized, shaped, and located on said cover so as to limit displacement of said cover about the projection when said cover is secured to the electrical box.

* * * * *

UNITED STATES PATENT AND TRADEMARK OFFICE
CERTIFICATE OF CORRECTION

| | |
|---|---|
| PATENT NO. | : 7,390,965 B2 |
| APPLICATION NO. | : 11/561190 |
| DATED | : June 24, 2008 |
| INVENTOR(S) | : Hartwig |

Page 1 of 1

It is certified that error appears in the above-identified patent and that said Letters Patent is hereby corrected as shown below:

In Claim 4, at column 11, line 14, delete "though" and insert --through--.

In Claim 10, at column 11, line 51, delete "though" and insert --through--.

In Claim 11, at column 12, line 13, delete "though" and insert --through--.

Signed and Sealed this

Second Day of September, 2008

JON W. DUDAS
*Director of the United States Patent and Trademark Office*